(12) United States Patent
Abe

(10) Patent No.: US 10,811,900 B2
(45) Date of Patent: Oct. 20, 2020

(54) UNINTERRUPTIBLE POWER SUPPLY SYSTEM AND UNINTERRUPTIBLE POWER SUPPLY APPARATUS

(71) Applicant: TOSHIBA MITSUBISHI-ELECTRIC INDUSTRIAL SYSTEMS CORPORATION, Chuo-ku (JP)

(72) Inventor: Shoichi Abe, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/475,243

(22) PCT Filed: Jan. 4, 2017

(86) PCT No.: PCT/JP2017/000036
§ 371 (c)(1),
(2) Date: Jul. 1, 2019

(87) PCT Pub. No.: WO2018/127946
PCT Pub. Date: Jul. 12, 2018

(65) Prior Publication Data
US 2019/0334377 A1    Oct. 31, 2019

(51) Int. Cl.
*H02J 9/00* (2006.01)
*H02J 9/06* (2006.01)
(Continued)

(52) U.S. Cl.
CPC ............ *H02J 9/061* (2013.01); *H02J 3/385* (2013.01); *H02J 7/35* (2013.01); *H02M 3/158* (2013.01); *H02M 7/219* (2013.01)

(58) Field of Classification Search
CPC ............ H02J 9/00; H02J 5/00; H02J 2300/00
See application file for complete search history.

(56) References Cited

U.S. PATENT DOCUMENTS

2012/0267952 A1*  10/2012  Ballatine ................ H02J 7/34
                                                                    307/26
2013/0088081 A1*   4/2013  Siri ........................ H02J 7/35
                                                                    307/46
(Continued)

FOREIGN PATENT DOCUMENTS

JP    2011097818 A  *  5/2011  ............ H02J 1/102
JP    2013-183577 A     9/2013
(Continued)

OTHER PUBLICATIONS

International Search Report dated Mar. 14, 2017 in PCT/JP2017/000036 filed on Jan. 4, 2017.
(Continued)

*Primary Examiner* — Rexford N Barnie
*Assistant Examiner* — Joseph N Inge
(74) *Attorney, Agent, or Firm* — Oblon, McClelland, Maier & Neustadt, L.L.P.

(57) ABSTRACT

A first controller for a first DC/DC converter is configured to generate a first current command value based on a smallest value of an output current when an output voltage of the solar battery is equal to an optimum operating voltage in maximum power point tracking control and an output current for outputting a consumption current between the solar battery and the DC load and a charging current of the power storage apparatus. A second controller for a second DC/DC converter is configured to generate a second current command value such that a voltage of the output terminal is equal to a reference voltage.

6 Claims, 11 Drawing Sheets

(51) Int. Cl.
   *H02J 3/38*      (2006.01)
   *H02J 7/35*      (2006.01)
   *H02M 3/158*     (2006.01)
   *H02M 7/219*     (2006.01)

(56) References Cited

U.S. PATENT DOCUMENTS

2013/0234521 A1* 9/2013 Eom ................. H02J 3/386
                                                 307/66
2017/0358929 A1* 12/2017 Koeppe ................ H02J 3/46

FOREIGN PATENT DOCUMENTS

JP       2014-7929 A       1/2014
WO   WO-2012057032 A1 *    5/2012   .............. H02J 1/102

OTHER PUBLICATIONS

Office Action issued Aug. 18, 2020, in Indian Patent Application No. 201917031226.

* cited by examiner (MODE A1)

(MODE A2)

(MODE A3)

(MODE B1)

(MODE B2)

(MODE B3)

UNINTERRUPTIBLE POWER SUPPLY SYSTEM AND UNINTERRUPTIBLE POWER SUPPLY APPARATUS

TECHNICAL FIELD

The present invention relates to an uninterruptible power supply system and an uninterruptible power supply apparatus.

BACKGROUND ART

An uninterruptible power supply (UPS) apparatus usually includes a converter that converts AC power into DC power and an inverter that converts DC power into AC power as described in, for example, Japanese Patent Laying-Open No. 2014-7929 (PTL 1). The uninterruptible power supply apparatus is connected with a storage battery and a solar battery, and at least one of the storage battery and the solar battery supplies DC power to the uninterruptible power supply apparatus.

In the uninterruptible power supply apparatus, the converter converts AC power from a commercial AC power supply into DC power. The inverter converts the DC power from the converter or the DC power from the storage battery and the solar battery into AC power with a constant frequency and a constant voltage and supplies the AC power after the conversion to an alternating current (AC) load.

In case of abnormality (e.g., power failure or voltage sag) in the commercial AC power supply, the storage battery or solar battery supplies DC power to the inverter. The uninterruptible power supply apparatus thus supplies AC power to the AC load uninterruptedly in case of abnormality in the commercial AC power supply.

CITATION LIST

Patent Literature

PTL 1: Japanese Patent Laying-Open No. 2014-7929

SUMMARY OF INVENTION

Technical Problem

In supply to a direct current (DC) load using the uninterruptible power supply apparatus, the following configuration is usually employed: AC power generated by the inverter is converted into DC power according to the DC load by an AC adapter provided externally of the apparatus, and the DC power after the conversion is supplied to the DC load. This configuration, however, may have reduced efficiency due to a power loss caused in each of the inverter and the AC adapter.

Since the solar battery inherently has a power generation amount varying depending on, for example, the intensity of solar radiation, if the amount of power required by the DC load decreases, it is difficult to reduce the amount of power of the solar battery with high responsiveness. Consequently, an excessive increase in the surplus power of the solar battery results in an increase in the voltage applied to the DC load, which may damage the DC load.

In the configuration in which the surplus power of the solar battery is stored in the storage battery and the DC power from the solar battery and the storage battery is supplied to the DC load, if the surplus power of the solar battery becomes excessively large, the voltage between terminals of the storage battery increases excessively, which may damage the storage battery.

The present invention has been made to solve the above problem and has an object to provide an uninterruptible power supply system capable of supplying power to a DC load with high efficiency and high reliability.

Solution to Problem

According to an aspect of the present invention, an uninterruptible power supply system for supplying DC power to a DC load includes an uninterruptible power supply apparatus, a solar battery, and a power storage apparatus. The uninterruptible power supply apparatus is connected between a commercial AC power supply and the DC load. The solar battery is configured to convert sunlight energy into DC power. The power storage apparatus is configured to store DC power. The uninterruptible power supply apparatus includes an output terminal connected to the DC load, first and second DC/DC converters, a converter, and first to third controllers. The first DC/DC converter is configured to perform DC voltage conversion between the solar battery and the output terminal. The second DC/DC converter is configured to perform DC voltage conversion between the power storage apparatus and the output terminal. The converter is connected between the commercial AC power supply and the output terminal and configured to convert AC power supplied from the commercial AC power supply into DC power. The first controller is configured to control the first DC/DC converter to flow a current according to a first current command value from the solar battery to the output terminal. The second controller is configured to control the second DC/DC converter to flow a current according to a second current command value between the power storage apparatus and the output terminal. The third controller is configured to control the converter such that a voltage of the output terminal is equal to a reference voltage during normal operation in which the commercial AC power supply supplies AC power. The first controller is configured to generate the first current command value based on the smallest value of an output current when an output voltage of the solar battery is an optimum operating voltage in maximum power point tracking control and an output current for outputting a consumption current between the solar battery and the DC load and a charging current of the power storage apparatus. The second controller is configured to generate the second current command value such that a voltage of the output terminal is equal to the reference voltage.

Advantageous Effects of Invention

The present invention can provide an uninterruptible power supply system capable of supplying power to a DC load with high efficiency and high reliability.

DESCRIPTION OF EMBODIMENTS

Figure 1:
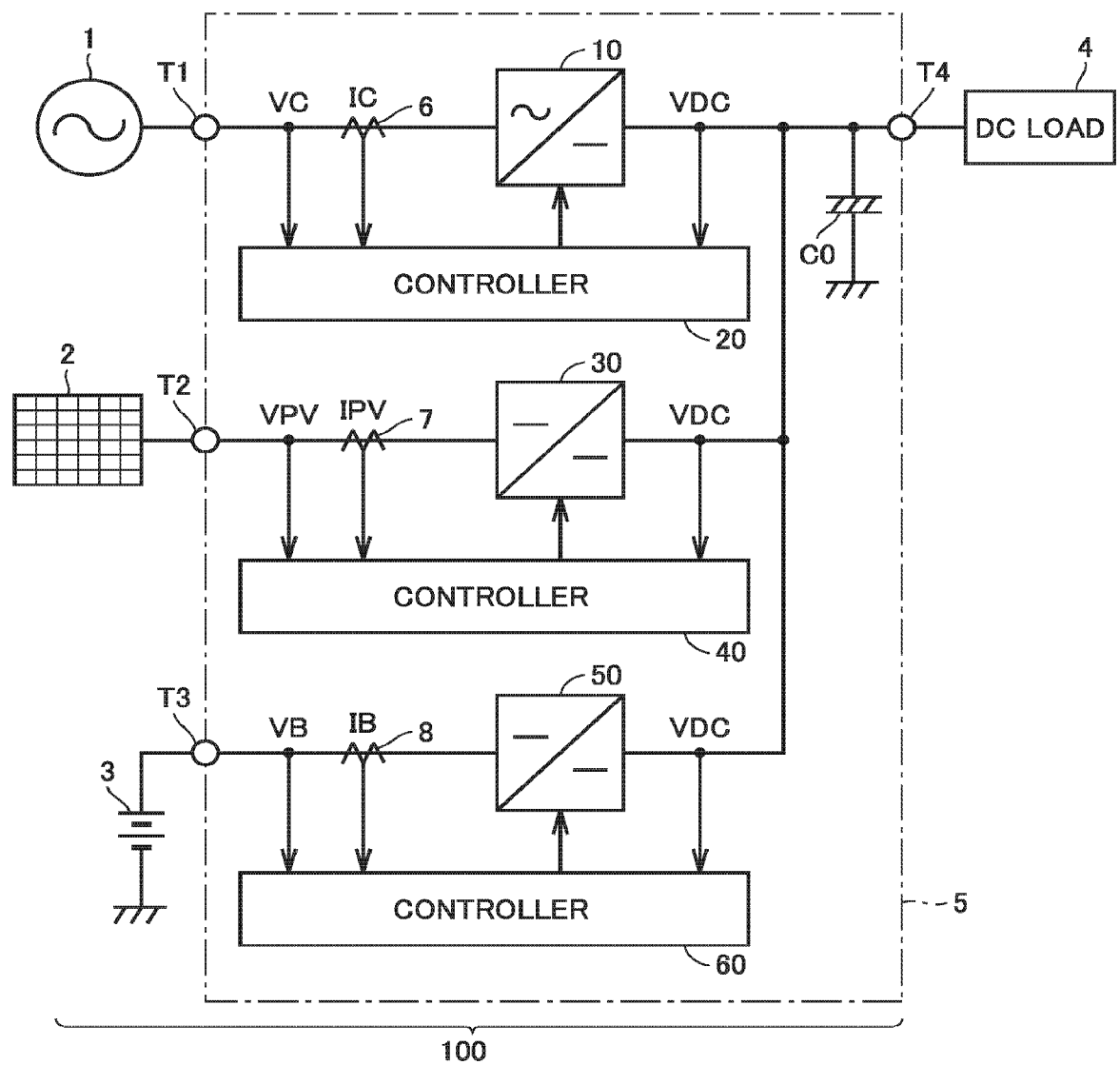
FIG. 1 is a circuit block diagram showing a configuration of an uninterruptible power supply system according to an embodiment of the present invention.

Embodiments of the present invention will be described below in detail with reference to the drawings. The same or corresponding elements in the drawings have the same reference characters allotted, and description thereof will not be repeated.

Embodiment 1

FIG. 1 is a circuit block diagram showing a configuration of an uninterruptible power supply system 100 according to an embodiment of the present invention. With reference to FIG. 1, uninterruptible power supply system 100 according to the present embodiment is configured to supply DC power to a DC load 4. Uninterruptible power supply system 100 includes a solar battery 2, a storage battery 3, and an uninterruptible power supply apparatus 5. Uninterruptible power supply apparatus 5 is connected between a commercial AC power supply 1 and DC load 4.

Commercial AC power supply 1 supplies AC power with a commercial frequency to uninterruptible power supply apparatus 5. Solar battery 2 converts sunlight energy into DC power. The power generation amount of solar battery 2 increases with a higher intensity of solar radiation. Storage battery 3 is a battery capable of charging and discharging of DC power. Storage battery 3 corresponds to one embodiment of a "power storage apparatus" that stores DC power. DC load 4 is, for example, an electrical device driven by DC power.

During normal operation in which commercial AC power supply 1 supplies AC power, uninterruptible power supply apparatus 5 converts AC power supplied from commercial AC power supply 1 into DC power and then supplies the DC power to DC load 4. Uninterruptible power supply apparatus 5 also performs maximum power point tracking control based on an output voltage VPV and an output current IPV of solar battery 2, and flows current from solar battery 2 to DC load 4 such that output voltage VPV of solar battery 2 is equal to an optimum operating voltage.

Further, uninterruptible power supply apparatus 5 supplies DC power from solar battery 2 to storage battery 3 if an output voltage VDC is higher than a predetermined reference voltage VDCR (e.g., 400 V). In contrast, uninterruptible power supply apparatus 5 supplies DC power generated by the AC power from commercial AC power supply 1 or the DC power from storage battery 3 to DC load 4 if output voltage VDC is lower than reference voltage VDCR.

Uninterruptible power supply apparatus 5 also limits output voltage VDC to be not higher than an upper limit voltage VDCH (e.g., 500 V) and limits a voltage between terminals VB of storage battery 3 to be not higher than an upper limit voltage VBH (e.g., 300 V).

In detail, uninterruptible power supply apparatus 5 includes terminals T1 to T4, current sensors 6 to 8, a converter 10, choppers 30 and 50, controllers 20, 40, and 60, and a smoothing capacitor C0. Terminals T1 to T4 are connected to commercial AC power supply 1, solar battery 2, storage battery 3, and DC load 4, respectively. Smoothing capacitor C0 is connected between terminal T4 (output terminal) and a line with reference voltage (e.g., ground voltage).

Converter 10 is connected between terminals T1 and T4. Converter 10 is controlled by controller 20 (third controller). During normal operation, converter 10 converts AC power supplied from commercial AC power supply 1 into DC power and supplies the DC power to smoothing capacitor C0. Current sensor 6 detects an AC current IC flowing from commercial AC power supply 1 to converter 10 and provides controller 20 with a signal indicating a detection value.

Controller 20 detects an AC voltage VC supplied from commercial AC power supply 1 and a voltage between terminals VDC of smoothing capacitor C0 and controls converter 10 based on the detection values thereof and a detection value of current sensor 6. During normal operation, controller 20 controls converter 10 such that voltage between terminals VDC of smoothing capacitor C0 is equal to reference voltage VDCR. During power failure in which a supply of AC power from commercial AC power supply 1 is stopped, controller 20 stops the operation of converter 10.

Chopper 30 is connected between terminals T2 and T4. Chopper 30 is controlled by controller 40 (first controller). Chopper 30 supplies the DC power generated by solar battery 2 to smoothing capacitor C0. Current sensor 7 detects a DC current IPV flowing from solar battery 2 to chopper 30 and provides controller 40 with a signal indicating a detection value. Chopper 30 corresponds to an embodiment of a "first DC/DC converter."

Controller 40 detects voltage between terminals VPV of solar battery 2 and voltage between terminals VDC of smoothing capacitor C0 and controls chopper 30 based on the detection values thereof and a detection value of current sensor 7. Controller 40 controls chopper 30 such that voltage between terminals VPV of solar battery 2 is equal to optimum operating voltage VDCR. Alternatively, controller 40 controls chopper 30 such that solar battery 2 outputs a DC current corresponding to a sum of a consumption current of DC load 4 and a charging current of storage battery 3. Further, controller 40 controls chopper 30 such that voltage between terminals VDC of smoothing capacitor C0 is not higher than upper limit voltage VDCH.

Chopper 50 is connected between terminals T3 and T4. Chopper 50 is controlled by controller 60 (second controller). Chopper 50 supplies DC power from smoothing capacitor C0 to storage battery 3. Chopper 50 also supplies DC power of storage battery 3 to smoothing capacitor C0. Current sensor 8 detects a DC current IB flowing between storage battery 3 and chopper 50 and provides controller 60 with a signal indicating a detection value. Chopper 50 corresponds to an embodiment of a "second DC/DC converter."

Controller 60 detects voltage between terminals VB of storage battery 3 and voltage between terminals VDC of smoothing capacitor C0 and controls chopper 50 based on detection values thereof and a detection value of current sensor 8. Controller 60 controls chopper 50 such that voltage between terminals VDC of smoothing capacitor C0 is equal to reference voltage VDCR (<VDCH) and controls chopper 50 such that voltage between terminals VB of storage battery 3 is not higher than upper limit voltage VBH (e.g., 300 V). Further, controller 60 controls chopper 50 such that voltage between terminals VDC of smoothing capacitor C0 is not higher than upper limit voltage VDCH.

Figure 2:
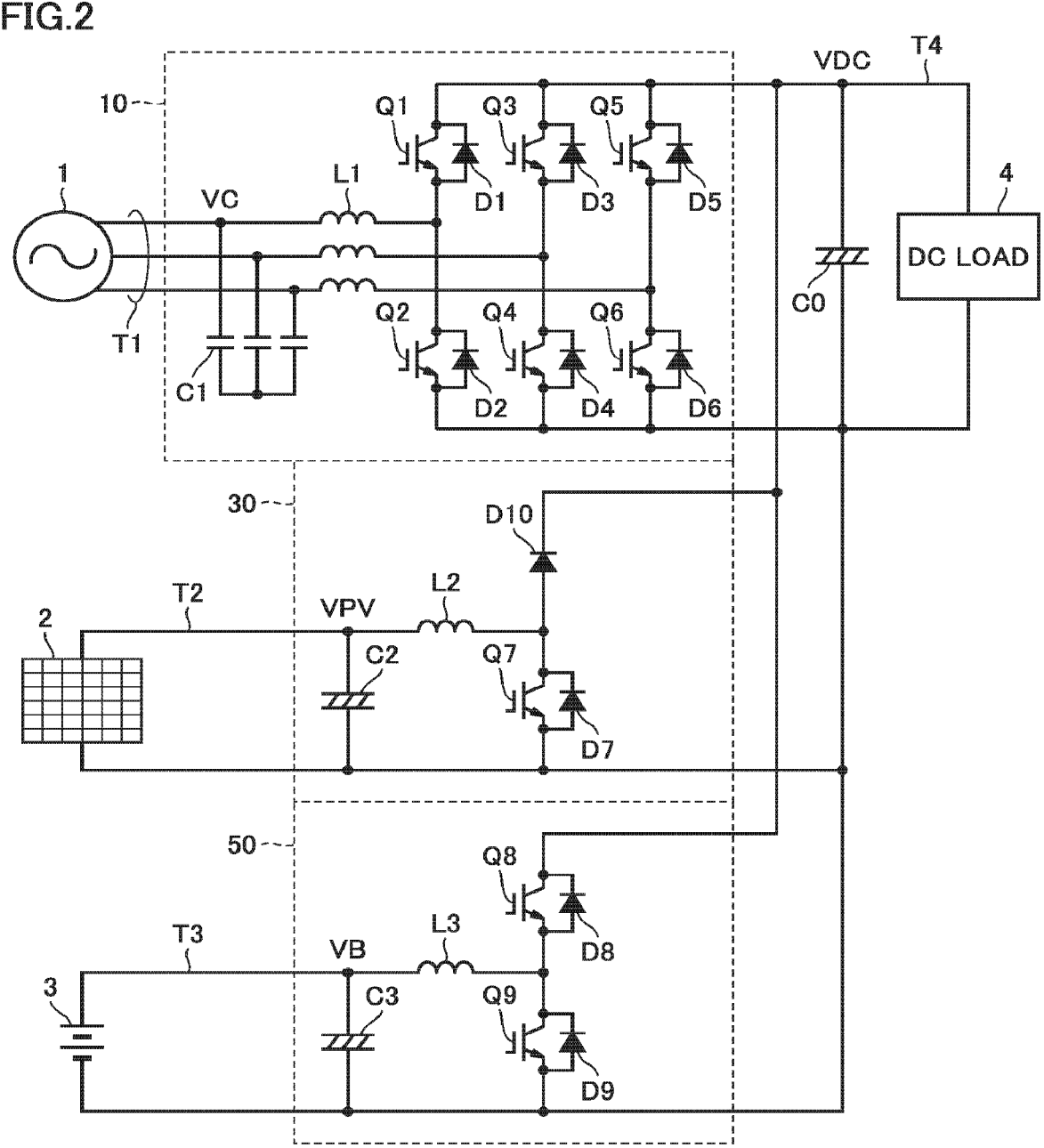
FIG. 2 is a circuit block diagram showing configurations of a converter and a chopper.

FIG. 2 is a circuit block diagram showing configurations of converter 10 and choppers 30 and 50. With reference to FIG. 2, converter 10 includes switching elements Q1 to Q6, diodes D1 to D6, inductors L1, and capacitors C1. Although switching elements Q1 to Q6 are, for example, insulated gate bipolar transistors (IGBTs), which may be other self-turn-off switching elements.

Switching elements Q1 and Q2 are connected in series between terminal T4 and the line with reference voltage. Switching elements Q3 and Q4 are connected in series between terminal T4 and the line with reference voltage. Switching elements Q5 and Q6 are connected in series between terminal T4 and the line with reference voltage. Diodes D1 to D6 are connected in anti-parallel with switching elements Q1 to Q6, respectively. Each of three reactors L1 is connected between a connection point between two series-connected switching elements and terminal T1. First electrodes of three capacitors C1 are connected to terminal T1, and second electrodes thereof are connected to each other. Switching elements Q1 to Q6 are subjected to pulse width modulation (PWM) control by controller 20.

Chopper 30 includes a capacitor C2, an inductor L2, a switching element Q7, and diodes D7 and D10. Switching element Q7 is, for example, an IGBT. Capacitor C2 is connected between terminal T2 and the line with reference voltage. Inductor L2 and switching element Q7 are connected in series between terminal T2 and the line with reference voltage. Diode D7 is connected in anti-parallel with switching element Q7. Diode D10 has an anode connected to the collector of switching element Q7 and a cathode connected to terminal T4.

Switching element Q7 is PWM-controlled by controller 40 and is turned on and off in predetermined periods. Turning on switching element Q7 causes current to flow from solar battery 2 through inductor L2 and switching element Q7 to the line with reference voltage, so that electromagnetic energy is stored in inductor L2. Turning off switching element Q7 discharges the electromagnetic energy stored in inductor L2, so that current flows from inductor L2 through diode D10 to smoothing capacitor C0. At this time, the voltage of the anode of diode D10 is equal to a voltage obtained by adding the voltage between terminals of inductor L2 to voltage between terminals VPV of solar battery 2.

Chopper 50 includes a capacitor C3, an inductor L3, switching elements Q8 and Q9, and diodes D8 and D9. Switching elements Q8 and Q9 are, for example, IGBTs. Capacitor C3 is connected between terminal T3 and the line with reference voltage. Switching elements Q8 and Q9 are connected in series between terminal T4 and the line with reference voltage. Diodes D8 and D9 are connected in anti-parallel with switching elements Q8 and Q9, respectively. Inductor L3 is connected between terminal T3 and a connection point between switching elements Q8 and Q9.

Switching elements Q8 and Q9 are PWM-controlled by controller 60. Chopper 50 steps up voltage between terminals VB of storage battery 3 and supplies it to smoothing capacitor C0. Chopper 50 also steps down voltage between terminals VDC of smoothing capacitor C0 and supplies it to storage battery 3.

Figure 3:
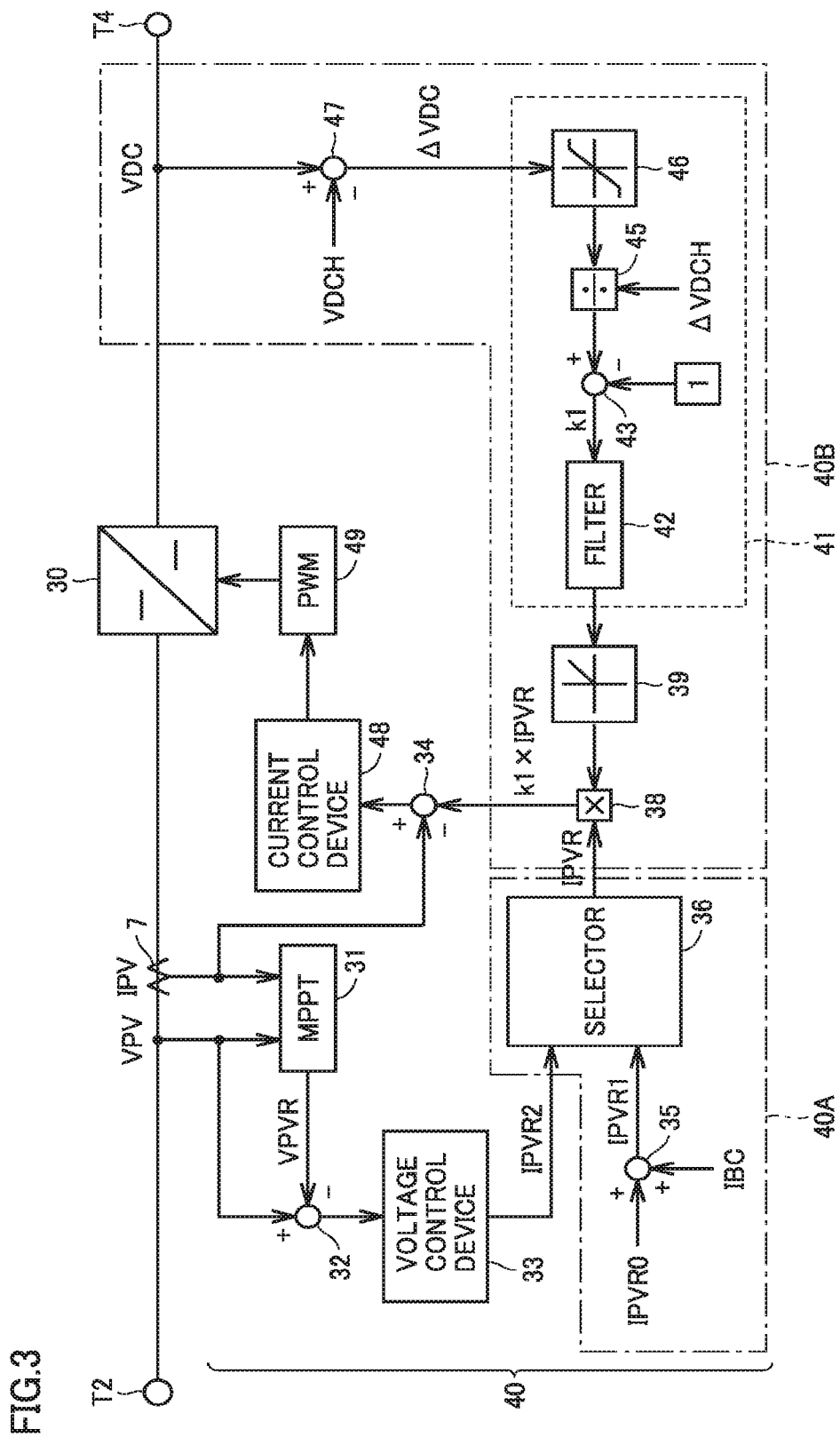
FIG. 3 is a circuit block diagram showing a configuration of a controller.

FIG. 3 is a circuit block diagram showing a configuration of controller 40. With reference to FIG. 3, controller 40 includes a maximum power point tracking (MPPT) control device 31, subtracters 32 and 34, a voltage control device 33, a current control device 48, a PWM control device 49, a power generation reducing device 40A, and an overvoltage reducing device 40B.

MPPT control device 31 performs maximum power point tracking control of solar battery 2 and, based on output voltage VPV and output current IPV of solar battery 2, determines an optimum operating voltage at which the output of solar battery 2 reaches its maximum. MPPT control device 31 sets reference voltage VPVR to the optimum operating voltage.

Solar battery 2 is characterized in that voltage between terminals VPV decreases as output current IPV increases. The output of solar battery 2 changes along a gently-sloping-mountain-like curve in accordance with voltage between terminals VPV. A point at which the output of solar battery 2 reaches its maximum is referred to as a maximum power point, and voltage between terminals VPV of solar battery 2 at that time is referred to as an optimum operating voltage.

That is to say, the maximum power can be extracted from solar battery 2 by extracting current IPV such that voltage between terminals VPV of solar battery 2 coincides with the optimum operating voltage. When the intensity of solar radiation changes, the maximum power point and the optimum operating voltage also change. MPPT control device 31 thus adjusts reference voltage VPVR such that it coincides with the optimum operating voltage based on output voltage VPV and output current IPV of solar battery 2.

Subtracter 32 subtracts reference voltage VPVR generated in MPPT control device 31 from the detection value of output voltage VPV of solar battery 2 and provides voltage control device 33 with a signal indicating a subtraction result VPV−VPVR. Voltage control device 33 generates a current command value IPVR2 for setting VPV−VPVR to 0 and provides power generation reducing device 40A with current command value IPVR2.

Power generation reducing device 40A includes an adder 35 and a selector 36. Power generation reducing device 40A is provided with a current command value IPVR0 and a current command value IBC from a higher-order controller that controls uninterruptible power supply system 100 in a centralized manner.

Current command value IPVR0 is a command value for flowing a current required by DC load 4 from solar battery 2 to DC load 4. Current command value IPVR0 is set based on the consumption power of DC load 4 and output voltage VPV of solar battery 2.

More specifically, the consumption power of DC load 4 is represented by a product VDC×IL of voltage between terminals VDC of smoothing capacitor C0 and consumption current IL, where IL is the current (hereinafter also referred to as consumption current) flowed from solar battery 2 to DC load 4. When the number of solar batteries 2 is n (n is a positive integer), power PPV to be generated by one solar battery 2 for supplying DC load 4 with power is VDC×IL/n. Current command value IPVR0 by which solar battery 2 generates power PPV can be determined by dividing power PPV by voltage between terminals VPV of solar battery 2 (IPVR0=PPV/VPV).

Current command value IBC is a command value of a charging current IB for causing storage battery 3 to enter a predetermined fully charged state and is set based on voltage between terminals VB of storage battery 3. Specifically, current command value IBC can be determined by subtracting a detection value of voltage between terminals VB of storage battery 3 from voltage between terminals VBR corresponding to the predetermined fully charged state and then dividing a subtraction result VBR−VB by the internal resistance value of storage battery 3.

Adder 35 adds current command value IPVR0 and current command value IBC together to generate a current command value IPVR1.

Upon receipt of current command value IPVR1 from adder 35 and current command value IPVR2 from voltage control device 33, selector 36 selects the smallest value of the two current command values IPVR1 and IPVR2. Selector 36 sets the selected current command value to a reference current value IPVR.

That is to say, power generation reducing device 40A sets, to reference current value IPVR, a smaller one of current command value IPVR2 generated through maximum power point tracking control of solar battery 2 and current command value IPVR1 generated based on the consumption current of DC load 4 and the charging current of storage battery 3.

If the maximum power that can be extracted from solar battery 2 is greater than a total value of the consumption power of DC load 4 and the charging power of storage battery 3, in some cases, IPVR1>IPVR2. In such cases, power generation reducing device 40A sets current command value IPVR2 to reference current value IPVR. Controlling output current IPV of solar battery 2 such that it coincides with the set reference current value IPVR causes the output of solar battery 2 to be equal to the power with a total value of the consumption power of DC load 4 and the charging power of storage battery 3. This can reduce the generation of power, which exceeds the power required by DC load 4 and storage battery 3, by solar battery 2. This prevents surplus power of solar battery 2 from becoming excessively large if the power required by DC load 4 and storage battery 3 decreases. Consequently, an excessive increase in voltage VDC of output terminal T4 and voltage between terminals VB of storage battery 3 can be reduced.

Overvoltage reducing device 40B is configured to limit voltage between terminals VDC of smoothing capacitor C0 to a voltage not higher than upper limit voltage VDCH. Specifically, overvoltage reducing device 40B includes a subtracter 47, a voltage control device 41, a limiter 39, and a multiplier 38. Subtracter 47 subtracts voltage between terminals VDC of smoothing capacitor C0 from upper limit voltage VDCH and provides voltage control device 41 with a signal ΔVDC indicating a subtraction result VDCH−VDC.

Voltage control device 41 generates a coefficient k1 for correcting reference current value IPVR to set VDCH−VDC to 0 and provides limiter 39 with coefficient k1. Specifically, voltage control device 41 includes a limiter 46, a divider 45, a subtracter 43, and a filter 42.

If a signal ΔVDC(=VDCH−VDC) determined by subtracter 47 is a value between an upper limit value ΔVDCH (>0) and 0, which is a lower limit value, limiter 46 causes signal ΔVDC to pass therethrough. If signal ΔVDC from subtracter 47 is on the positive side with respect to upper limit value ΔVDCH, limiter 46 sets signal ΔVDC to upper limit value ΔVDCH. If signal ΔVDC from subtracter 47 is on the negative side with respect to lower limit value 0, limiter 46 sets signal ΔVDC to lower limit value 0. That is to say, limiter 46 limits signal ΔVDC from subtracter 47 to a value not less than 0 and not greater than upper limit value ΔVDCH.

Divider 45 divides signal ΔVDC from limiter 46 by upper limit value ΔVDCH and provides subtracter 43 with a signal indicating a division result ΔVDC/ΔVDCH. As described above, signal ΔVDC from limiter 46 is limited to be not smaller than 0 and not greater than ΔVDCH. Division result ΔVDC/ΔVDCH output from divider 45 thus takes a value not smaller than 0 and not greater than 1 (0≤ΔVDC/ΔVDCH≤1).

Subtracter 43 subtracts signal ΔVDC/ΔVDCH from divider 45 from a value "1" and provides filter 42 with a signal indicating a subtraction result 1−ΔVDC/ΔVDCH as coefficient k1. If ΔVDC/ΔVDCH=1, the value of coefficient 1 output from subtracter 43 is zero. If ΔVDC/ΔVDCH=0, the value of coefficient k1 output from subtracter 43 is unity. That is to say, coefficient k1 output from subtracter 43 is a value not smaller than 0 and not greater than 1.

Filter 42 is an RC filter composed of, for example, a resistor and a capacitor. When coefficient k1 is input to filter 42, coefficient k1 changes slowly. Filter 42 allows a low-frequency component not greater than a cutoff frequency to pass therethrough to remove a high-frequency component. A cutoff frequency fc [Hz] and a time constant τ [sec] of filter 42 have a relationship 1=2πfc×τ. Filter 42 is configured to switch cutoff frequency fc between rising and falling of coefficient k1.

In detail, cutoff frequency fc in falling is set to a value higher than cutoff frequency fc in rising in filter 42. For example, cutoff frequency fc in falling is 2 kHz, and cutoff frequency fc in rising is 1 kHz. Consequently, the time constant in falling of coefficient k1 takes a value smaller than the time constant in rising of coefficient k1, resulting in a falling time shorter than a rising time. Coefficient k1 that has passed through filter 42 is provided to limiter 39.

Limiter 39 allows coefficient k1 from voltage control device 41 to pass therethrough if coefficient k1 is not smaller than 0 and not greater than 1 and sets coefficient k1 from voltage control device 41 to 0 if coefficient k1 is smaller than 0. Multiplier 38 multiplies reference current value IPVR from power generation reducing device 40A by coefficient k1 to correct reference current value IPVR. Multiplier 38 provides subtracter 34 with the corrected reference current value k1×IPVR.

Subtracter 34 subtracts a detection value of output current IPV of solar battery 2 from reference current value k1×IPVR and provides current control device 48 with a signal indicating a subtraction result k1×IPVR-IPV. Current control device 48 generates a current command value for flowing current k1×IPVR-IPV determined in subtracter 34. PWM control device 49 controls chopper 30 such that a current with a value corresponding to the current command value from current control device 48 flows from solar battery 2 to DC load 4.

Figure 4:
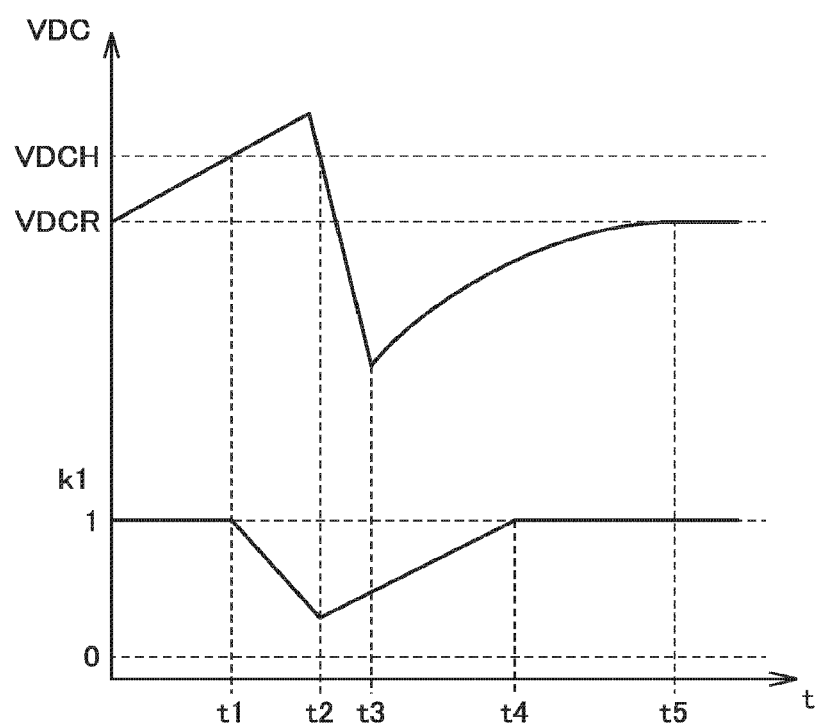
FIG. 4 is a waveform chart for illustrating a relationship between a voltage between terminals of a smoothing capacitor and a coefficient generated by a voltage control device.

FIG. 4 is a waveform chart for illustrating a relationship between voltage between terminals VDC of smoothing capacitor C0 and coefficient k1 generated by voltage control device 41.

As shown in FIG. 4, if VDC≤VDCH (between times t0 to t1), the value of coefficient k1 is unity (k1=1). When VDC>VDCH at time t1, the value of coefficient k1 falls below 1 (k1<1). Coefficient k1 at this time takes a value corresponding to ΔVDC(=VDCH−VDC).

After time t1, the value of coefficient k1 decreases from 1 in accordance with the time constant in falling of filter 42. Reference current value IPVR is corrected using coefficient k1, and chopper 30 is controlled based on the corrected reference current value k1×IPVR, so that output voltage VDC of chopper 30 starts to decrease. When output voltage VDC becomes not higher than upper limit voltage VDCH at time t2 after time t1, the value of coefficient k1 changes from decreasing to increasing. Since the time constant in rising of filter 42 is greater than the time constant in falling, coefficient k1 rises slowly. Consequently, output voltage VDC starts to increase at time t3 after time t2. When the value of coefficient k1 returns to 1, after a delay, output voltage VDC also converges on reference voltage VDCR.

When voltage between terminals VDC of smoothing capacitor C0 exceeds upper limit voltage VDCH, voltage between terminals VDC needs to be promptly limited to a voltage not higher than upper limit voltage VDCH in order to prevent a voltage applied to DC load 4 from becoming excessively high. Contrastingly, since the output of solar battery 2 depends on the intensity of solar radiation or the like, it is unstable and has low control responsiveness. Setting the falling time of coefficient k1 to be shorter than the rising time in overvoltage reducing device 40B can promptly reduce voltage between terminals VDC higher than upper limit voltage VDCH and also stably return voltage between terminals VDC which has been decreased to reference voltage VDCR.

Figure 5:
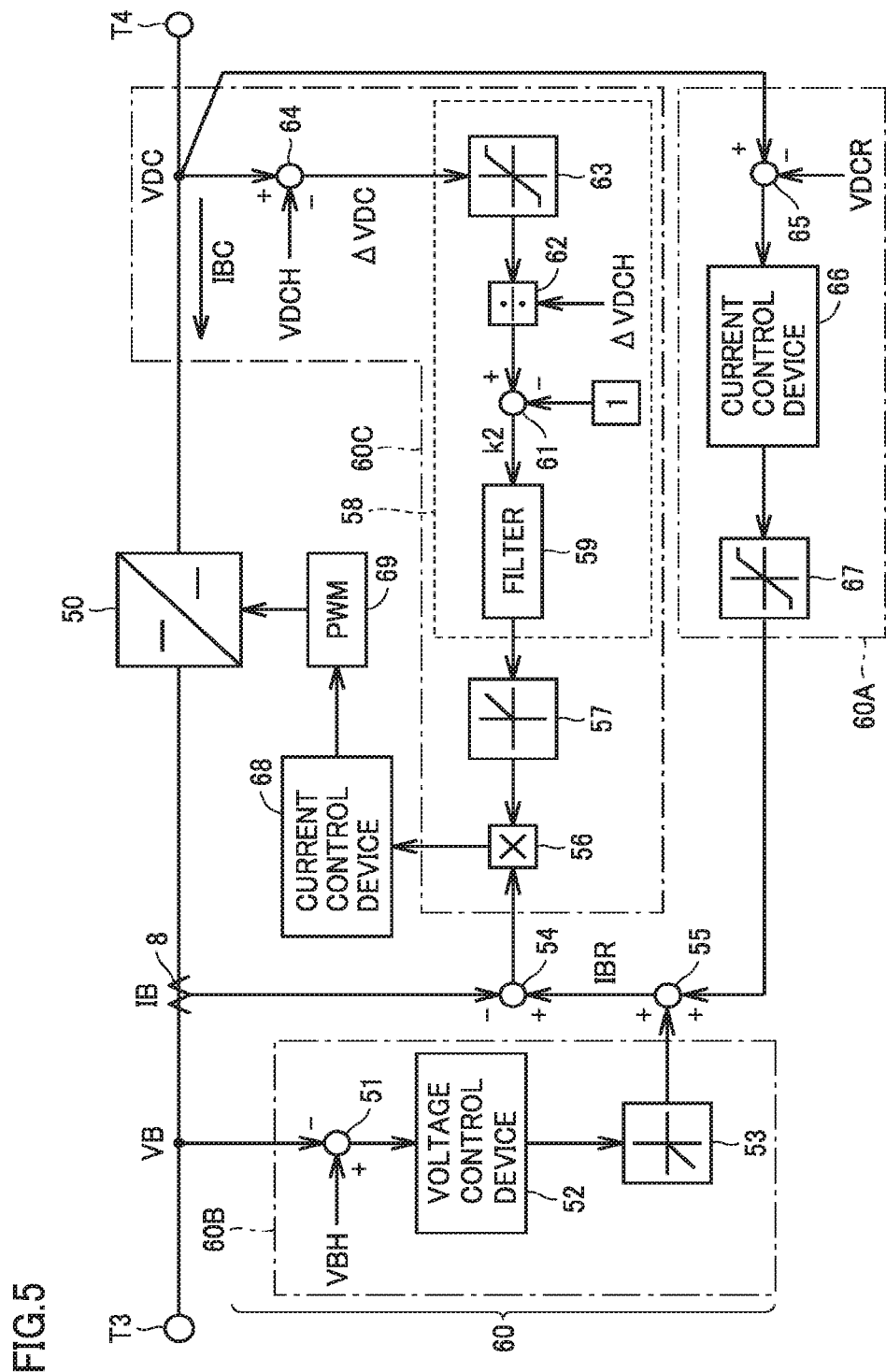
FIG. 5 is a circuit block diagram showing a configuration of a controller.

FIG. 5 is a circuit block diagram showing a configuration of controller 60. With reference to FIG. 5, controller 60 includes a voltage controller 60A, an overcharge reducing device 60B, an overvoltage reducing device 60C, a subtracter 54, an adder 55, a current control device 68, and a PWM control device 69.

Voltage controller 60A is configured to control voltage between terminals VDC of smoothing capacitor C0 to a constant voltage VDCR. Specifically, voltage controller 60A includes a subtracter 65, a voltage control device 66, and a limiter 67. Subtracter 65 subtracts reference voltage VDCR (e.g., 400 V) from voltage between terminals VDC of smoothing capacitor C0 and provides voltage control device 66 with a signal indicating a subtraction result VDCR-VDC. Reference voltage VDC is set to a voltage lower than upper limit voltage VDCH. Voltage control device 66 generates a current command value for setting VDCR-VDC to 0 and provides limiter 67 with the current command value.

Limiter 67 allows a current command value from voltage control device 66 to pass therethrough if the current command value is a value between a positive upper limit value and a negative upper limit value. Limiter 67 sets a current command value from voltage control device 66 to the positive upper limit value if the current command value is on the positive side with respect to the positive upper limit value. Limiter 67 sets a current command value from voltage control device 66 to the negative lower limit value if the current command value is on the negative side with respect to the negative lower limit value.

Overcharge reducing device 60B is configured to limit voltage between terminals VB of storage battery 3 to a voltage not higher than upper limit voltage VBH (e.g., 300 V). Specifically, overcharge reducing device 60B includes a subtracter 51, a voltage control device 52, and a limiter 53. Subtracter 51 subtracts voltage between terminals VB of storage battery 3 from upper limit voltage VBH and provides voltage control device 52 with a signal indicating a subtraction result VBH-VB. Voltage control device 52 generates a current command value for setting VBH-VB to 0 and provides limiter 53 with the current command value. Limiter 53 allows a current command value from voltage control device 52 to pass therethrough if the current command value is negative and sets a current command value from voltage control device 52 to 0 if the current command value is positive.

That is to say, if VB<VBH, the value of a current command value output from overcharge reducing device 60B is zero. Contrastingly, if VB>VBH, a current command value output from overcharge reducing device 60B has a value corresponding to VBH-VB.

Adder 55 adds the current command value from voltage controller 60A and the current command value from overcharge reducing device 60B together to generate a reference current value IBR. Subtracter 54 subtracts a detection value of charging current IB of storage battery 3 from reference current value IBR and provides overvoltage reducing device 60C with a signal indicating a subtraction result IBR-IB.

Overvoltage reducing device 60C is configured to limit voltage between terminals VDC of smoothing capacitor C0 to a voltage not higher than upper limit voltage VDCH. Overvoltage reducing device 60C is identical in basic configuration to overvoltage reducing device 40B shown in FIG. 3.

Specifically, overvoltage reducing device 60C includes a subtracter 64, a voltage control device 58, a limiter 57, and a multiplier 56. Subtracter 64 subtracts voltage between terminals VDC of smoothing capacitor C0 from upper limit voltage VDCH and provides voltage control device 58 with a signal ΔVDC indicating a subtraction result VDCH-VDC. Voltage control device 58 generates a coefficient k2 for correcting a signal IBR-IB from subtracter 54 and provides limiter 57 with coefficient k2.

More specifically, voltage control device 58 includes a limiter 63, a divider 62, a subtracter 61, and a filter 59. Limiter 63 limits a signal ΔVDC(=VDCH-VDC) determined by subtracter 64 to a value not smaller than 0 and not greater than upper limit value ΔVDCH.

Divider 62 divides signal ΔVDC from limiter 63 by upper limit value ΔVDCH and provides subtracter 61 with a signal indicating a division result ΔVDC/ΔVDCH. Subtracter 61 subtracts signal ΔVDC/ΔVDCH from divider 62 from a value "1" and provides filter 59 with a signal indicating a division result 1-ΔVDC/ΔVDCH as coefficient k2. Coefficient k2 output from subtracter 61 is a value not smaller than 0 and not greater than 1.

Filter 59 is identical to filter 42 of FIG. 3, which is, for example, an RC filter. In filter 59, a time constant in falling is a value smaller than a time constant in rising. Consequently, the falling time of coefficient k2 that has passed through filter 59 is shorter than the rising time of coefficient k2.

Limiter 57 allows coefficient k2 from voltage control device 58 to pass therethrough if coefficient k2 is not smaller than 0 and not greater than 1 and sets coefficient k2 to 0 if coefficient k2 from voltage control device 58 is smaller than 0.

Multiplier 56 multiples a signal IBR-IB from subtracter 54 by coefficient k2 and provides current control device 66 with a signal indicating a multiplication result k2×(IBR-IB). Current control device 66 generates a current command value for flowing a current k2×(IBR-IB) determined in multiplier 56. PWM control device 67 controls chopper 50 such that the current with a value corresponding to the current command value from current control device 66 flows from storage battery 3 to DC load 4.

First Example Operation of Uninterruptible Power Supply System

An example operation of uninterruptible power supply system 100 according to the present embodiment will now be described with reference to FIGS. 6 to 8.

Uninterruptible power supply system 100 according to the present embodiment includes commercial AC power supply 1, solar battery 2, and storage battery 3 as power supply sources to DC load 4. These three power supply sources each have available power fluctuating from various causes (e.g., an abnormality in a commercial system, fluctuations in sunshine conditions, and a remaining capacity of a storage battery).

Uninterruptible power supply system 100 according to the present embodiment thus determines the order of priority of power supply among the three power supply sources and, if power supply from a power supply source with a higher priority is difficult from any cause, supplies power using a power supply source with a lower priority.

In a first pattern described below, the order of priority of power supply is the order of solar battery 2, commercial AC power supply 1, and storage battery 3 in a descending order. That is to say, the DC power generated in solar battery 2 is mainly supplied to DC load 4 by chopper 30. When the DC power generated in solar battery 2 falls below consumption power in DC load 4, the AC power from commercial AC power supply 1 is converted into DC power by converter 10 and is then supplied to DC load 4. Storage battery 3 is used as a backup power supply in case where both of solar battery 2 and commercial AC power supply 1 have difficulty in supplying power.

In the first pattern, uninterruptible power supply system 100 has three modes A1 to A3. Uninterruptible power supply system 100 operates in any mode of three modes A1 to A3 in accordance with, for example, the power generation amount of solar battery 2 and the state of commercial AC power supply 1.

(1) Mode A1

Figure 6:
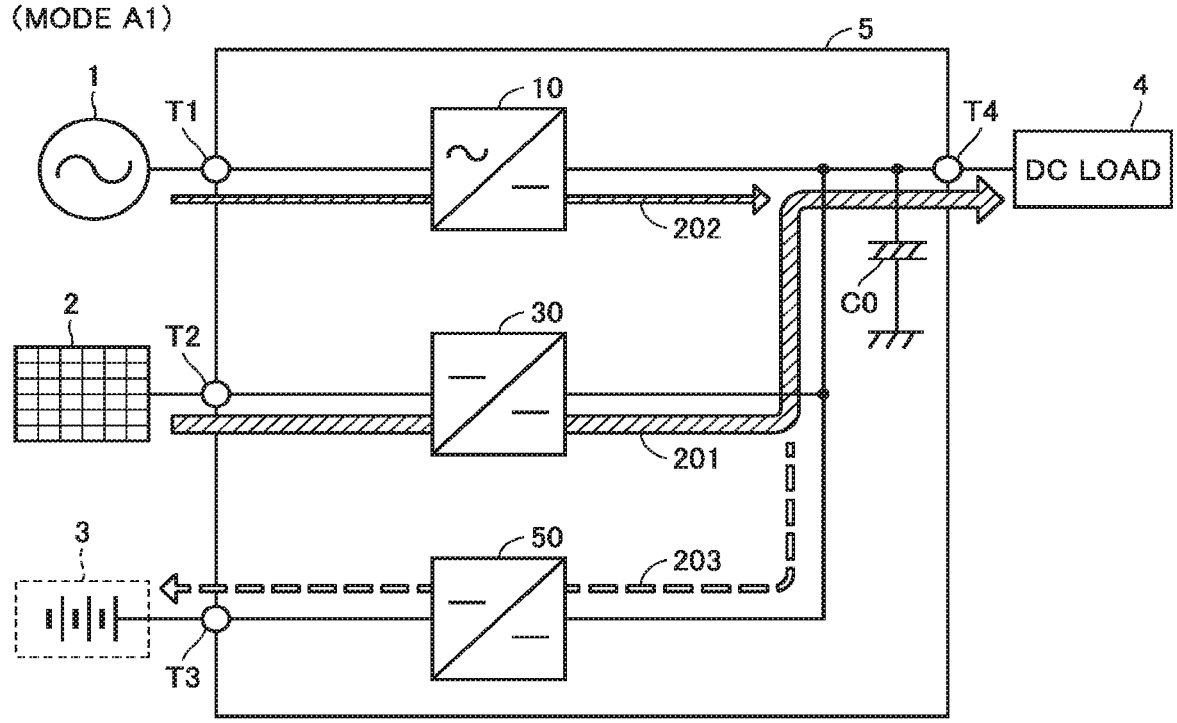
FIG. 6 is a diagram for illustrating an operation of the uninterruptible power supply system in a mode A1.

During power generation of solar battery 2, uninterruptible power supply system operates in mode A1 as shown in FIG. 6. In mode A1, the DC power generated in solar battery 2 is supplied to DC load 4 by chopper 30 as indicated by an arrow 201. When the power generation amount of solar battery 2 is greater than the power amount required by DC load 4, surplus power is supplied to storage battery 3 by chopper 50 as indicated by an arrow 203.

At this time, a current is flowed from solar battery 2 through chopper 30 to DC load 4. Output current IPV of solar battery 2 is adjusted to coincide with a smaller one of a current command value IPVR2 for causing an output voltage VPV of solar battery 2 to be equal to an optimum operating voltage and current command value IPVR1 generated based on a total value of the consumption current of DC load 4 and the charging current of storage battery 3.

A current is flowed from output terminal T3 through chopper 50 to storage battery 3 such that output voltage VDC of uninterruptible power supply apparatus 5 is equal to reference voltage VDCR. For example, if fine weather continues and voltage between terminals VB of storage battery 3 reaches upper limit voltage VBH, the operation of chopper 50 is stopped, which stops charging of storage battery 3.

Further, if the consumption power in DC load 4 decreases to increase surplus power and output voltage VDC of uninterruptible power supply apparatus 5 reaches upper limit voltage VDCH, a current flowing through chopper 30 is reduced.

During normal operation in which commercial AC power supply 1 supplies AC power, converter 10 is controlled such that output voltage VDC of uninterruptible power supply apparatus 5 is equal to reference voltage VDCR. Consequently, for example, if the power generation amount of solar battery 2 decreases to be smaller than the power amount required by DC load 4, uninterruptible power supply apparatus 5 can convert AC power from commercial AC power supply 1 into DC power and supply the DC power to DC load 4, as indicated by an arrow 202.

(2) Mode A2

Figure 7:
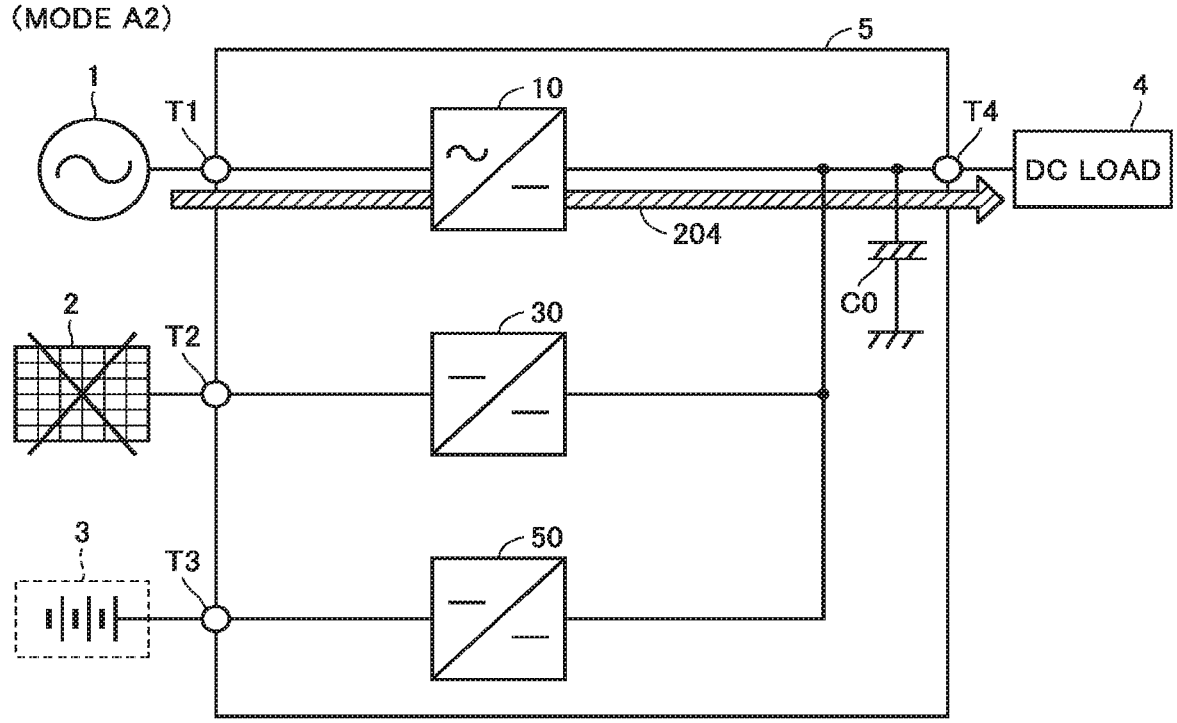
FIG. 7 is a diagram for illustrating an operation of the uninterruptible power supply system in a mode A2.

For example, when the power generation amount of solar battery 2 is zero at night, the uninterruptible power supply system operates in mode A2 as shown in FIG. 7. In mode A2, the operation of chopper 30 is stopped. Uninterruptible power supply apparatus 5 converts AC power from commercial AC power supply 1 into DC power and supplies the DC power to DC load 4, as indicated by an arrow 204.

At this time, a current is flowed from commercial AC power supply 1 through converter 10 to DC load 4 such that output voltage VDC of uninterruptible power supply apparatus 5 is equal to reference voltage VDCR. If voltage between terminals VB of storage battery 3 is lower than voltage between terminals VBR corresponding to a predetermined fully charged state, the DC power generated in converter 10 is supplied to DC load 4 and is also supplied to storage battery 3 by chopper 50. Consequently, storage battery 3 is charged to the predetermined fully charged state and then enters a standby state.

(3) Mode A3

Figure 8:
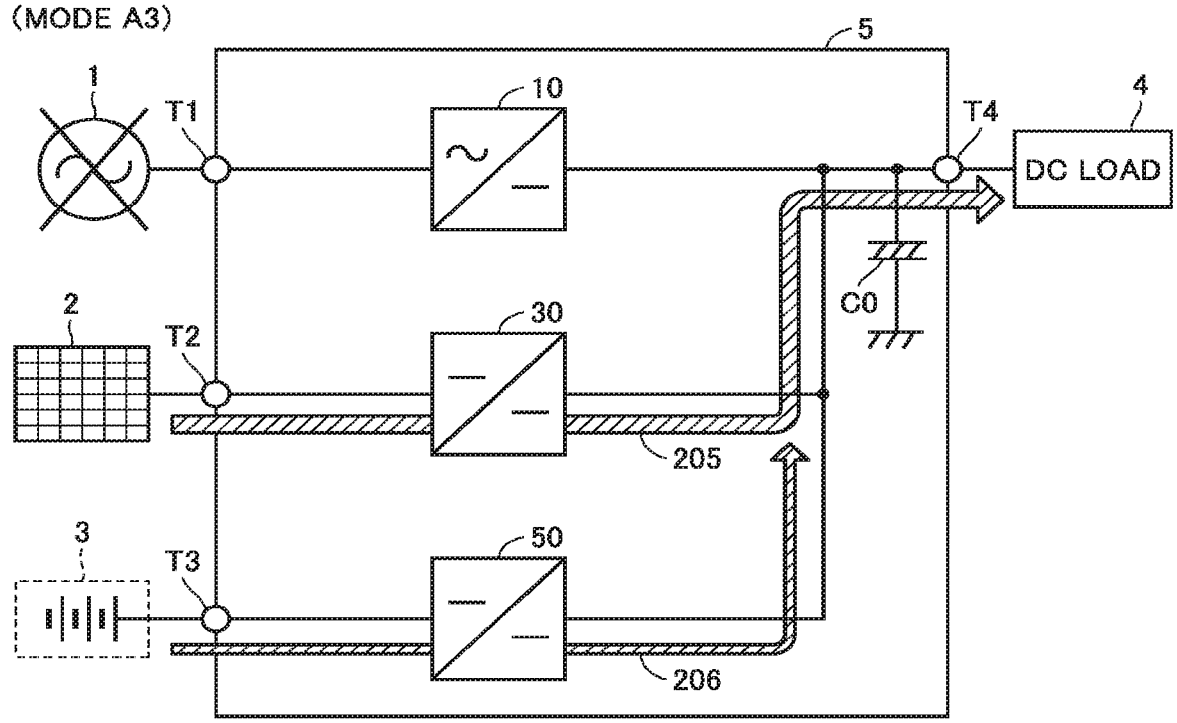
FIG. 8 is a diagram for illustrating an operation of the uninterruptible power supply system in a mode A3.

In power failure of commercial AC power supply 1, the uninterruptible power supply system operates in mode A3 as shown in FIG. 8. In mode A3, the operation of converter 10 is stopped. The DC power generated in solar battery 2 is supplied to DC load 4 by chopper 30 as indicated by an arrow 205.

At this time, output current IPV of solar battery 2 is adjusted to coincide with a smaller one of current command value IPVR2 for causing output voltage VPV of solar battery 2 to be equal to the optimum operating voltage and current command value IPVR1 generated based on a total value of the consumption current of DC load 4 and the charging current of storage battery 3.

Also, a current is flowed from storage battery 3 through chopper 50 to output terminal T3 such that output voltage VDC of uninterruptible power supply apparatus 5 is equal to reference voltage VDCR. Consequently, if the power generation amount of solar battery 2 is smaller than the power generation amount required by DC load 4, the DC power generated in solar battery 2 is supplied to DC load 4 by chopper 30, and the DC power of storage battery 3 is supplied to DC load 4 by chopper 50 as indicated by an arrow 206. When voltage between terminals VB of storage battery 3 is equal to a lower limit voltage VBL (e.g., 200 V), discharging of storage battery 3 is stopped in order to prevent overdischarge of storage battery 3.

Further, if the consumption power in DC load 4 decreases to increase surplus power and output voltage VDC of uninterruptible power supply apparatus 5 reaches upper limit voltage VDCH, currents flowing through choppers 30 and 50 are reduced. This prevents the voltage applied to DC load 4 and voltage between terminals VB of storage battery 3 from becoming excessively high.

Second Example Operation of Uninterruptible Power Supply System

A second pattern described below differs from the first pattern in the order of priority of power supply. In the second pattern, the order of priority of power supply is the order of solar battery 2, storage battery 3, and commercial AC power supply 1 in a descending order. That is to say, the DC power generated in solar battery 2 is supplied to DC load 4. When the DC power generated in solar battery 2 is smaller than the consumption power in DC load 4, the DC power of storage battery 3 is supplied to DC load 4 by chopper 50. Commercial AC power supply 1 is used to control output voltage VDC of uninterruptible power supply apparatus 5 at a constant voltage VDCR if both of solar battery 2 and storage battery 3 have difficulty in supplying power.

In the second pattern, uninterruptible power supply system 100 has three modes B1 to B3. Uninterruptible power supply system 100 operates in any mode of three modes B1 to B3 in accordance with, for example, the power generation amount of solar battery 2 and the state of commercial AC power supply 1.

(4) Mode B1

Figure 9:
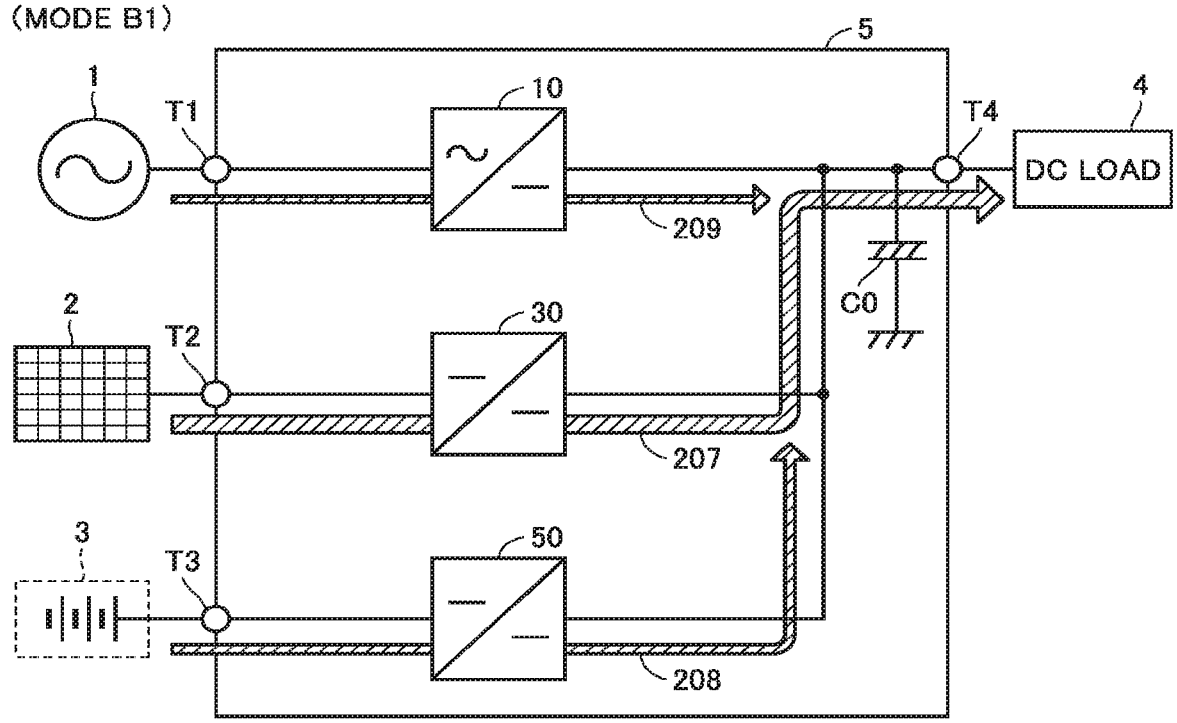
FIG. 9 is a diagram for illustrating an operation of the uninterruptible power supply system in a mode B1.

During power generation of solar battery 2, uninterruptible power supply system 100 operates in mode B1 as shown in FIG. 9. In mode B1, the DC power generated in solar battery 2 is supplied to DC load 4 by chopper 30 as indicated by an arrow 207. When the power generation amount of solar battery 2 is greater than the power generation amount required by DC load 4, surplus power is supplied to storage battery 3 by chopper 50, which is not shown in the figure.

At this time, a current is flowed from solar battery 2 through chopper 30 to DC load 4. Output current IPV of solar battery 2 is adjusted to coincide with a smaller one of current command value IPVR2 for causing output voltage VPV of solar battery 2 to be equal to the optimum operating voltage and current command value IPVR1 generated based on a total value of the consumption current of DC load 4 and the charging current of storage battery 3.

A current is flowed from storage battery 3 through chopper 50 to output terminal T3 such that output voltage VDC of uninterruptible power supply apparatus 5 is equal to reference voltage VDCR. Consequently, when the power generation amount of solar battery 2 is smaller than the power amount required by DC load 4, the DC power generated in solar battery 2 is supplied to DC load 4 by chopper 30, and the DC power of storage battery 3 is supplied to DC load 4 by chopper 50 as indicated by an arrow 208. If voltage between terminals VB of storage battery 3 is equal to a lower limit voltage VBL, discharging of storage battery 3 is stopped in order to prevent overdischarge of storage battery 3.

Further, for example, when the consumption power in DC load 4 decreases to increase surplus power and output voltage VDC of uninterruptible power supply apparatus 5 reaches upper limit voltage VDCH, currents flowing through choppers 30 and 50 are reduced.

During normal operation in which commercial AC power supply 1 supplies AC power, converter 10 is controlled such that output voltage VDC of uninterruptible power supply apparatus 5 is equal to reference voltage VDCR. Consequently, for example, when discharging of storage battery 3 is stopped under the circumstances where the power generation amount of solar battery 2 decreases to be lower than the power amount required by DC load 4, uninterruptible power supply apparatus 5 can convert the AC power from commercial AC power supply 1 into DC power and supply the DC power to DC load 4, as indicated by an arrow 209.

(5) Mode B2

Figure 10:
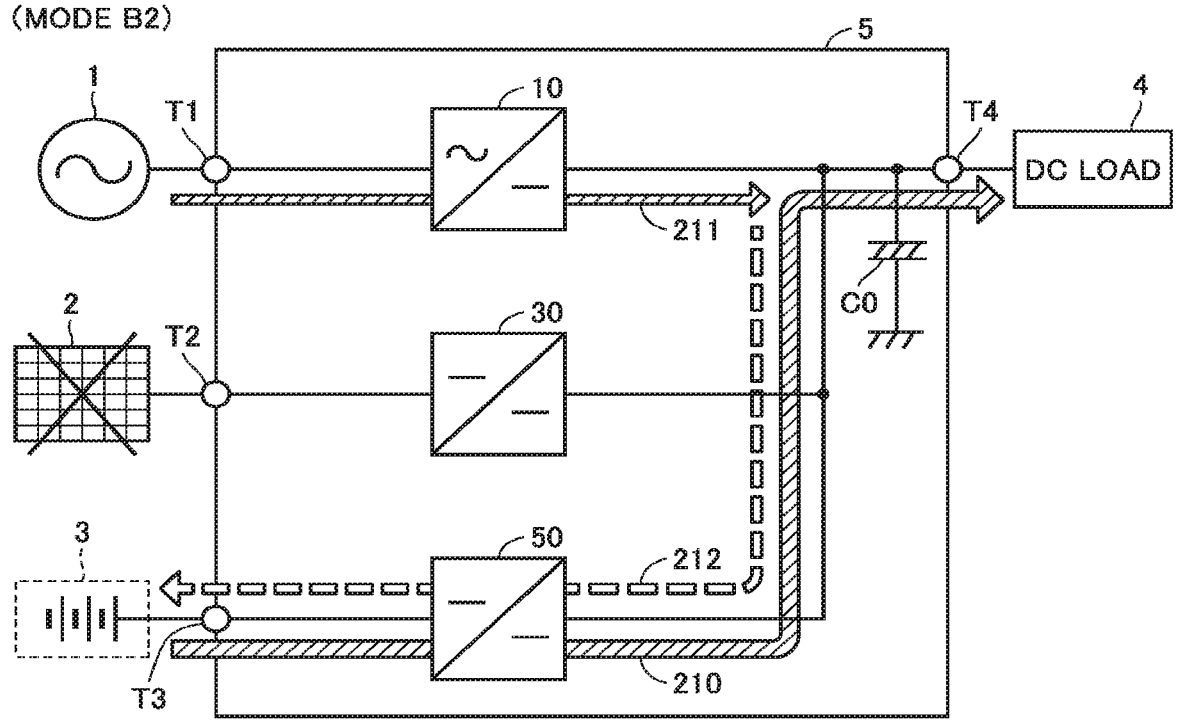
FIG. 10 is a diagram for illustrating an operation of the uninterruptible power supply system in a mode B2.

For example, when the power generation amount of solar battery 2 is zero at night, uninterruptible power supply system 100 operates in mode B2 as shown in FIG. 10. In mode B2, the operation of chopper 30 is stopped. Uninterruptible power supply apparatus 5 supplies the DC power of storage battery 3 through chopper 50 to DC load 4, as indicated by an arrow 210. At this time, chopper 50 is controlled such that output voltage VDC of uninterruptible power supply apparatus 5 is equal to reference voltage VDCR.

When voltage between terminals VB of storage battery 3 is equal to lower limit voltage VBL, discharging of storage battery 3 is stopped in order to prevent overdischarge of storage battery 3. When discharging of storage battery 3 is stopped, the AC power from commercial AC power supply 1 is converted into DC power by converter 10 and is then supplied to DC load 4, as indicated by an arrow 211. At this time, a current is flowed from commercial AC power supply 1 through converter 10 to DC load 4 such that output voltage VDC of uninterruptible power supply apparatus 5 is equal to reference voltage VDCR. Further, since voltage between terminals VB of storage battery 3 is lower than voltage between terminals VBR corresponding to the predetermined fully charged state, the DC power generated in converter 10 is supplied to DC load 4 and is also supplied to storage battery 3 by chopper 50, as indicated by an arrow 212. Consequently, storage battery 3 is charged to the predetermined fully charged state and enters a standby state.

(6) Mode B3

Figure 11:
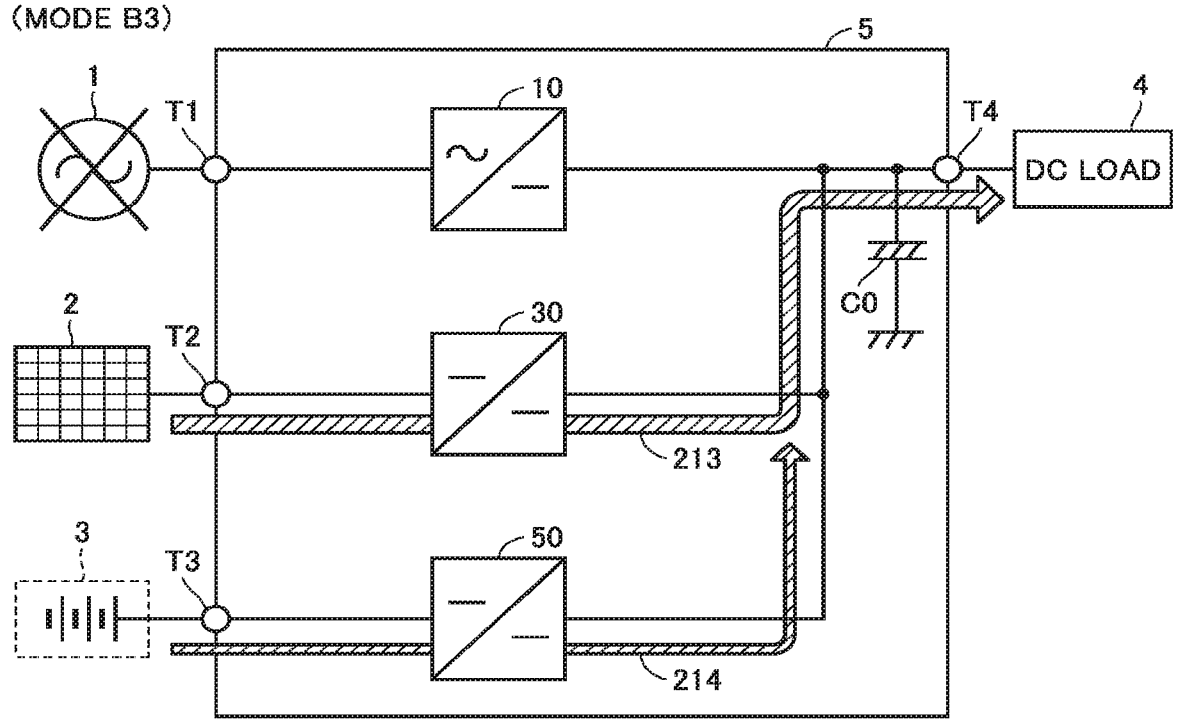
FIG. 11 is a diagram for illustrating an operation of the uninterruptible power supply system in a mode B3.

In power failure of commercial AC power supply 1, uninterruptible power supply system 100 operates in mode B3 as shown in FIG. 11. Mode B3 is identical to mode A3 shown in FIG. 8. That is to say, the operation of converter 10 is stopped, and the DC power generated in solar battery 2 is supplied to DC load 4 by chopper 30, as indicated by an arrow 213.

When the power generation amount of solar battery 2 is smaller than the power amount required by DC load 4, the DC power generated in solar battery 2 is supplied to DC load 4 by chopper 30, and the DC power of storage battery 3 is supplied to DC load 4 by chopper 50, as indicated by an arrow 214. When voltage between terminals VB of storage battery 3 is equal to lower limit voltage VBL, discharging of storage battery 3 is stopped in order to prevent overdischarge of storage battery 3.

Further, for example, when the consumption power in DC load 4 reduces to increase surplus power and output voltage VDC of uninterruptible power supply apparatus 5 reaches upper limit voltage VDCH, currents flowing through choppers 30 and 50 are reduced.

As described above, uninterruptible power supply system 100 according to the embodiment of the present invention is configured to convert the AC power from commercial AC power supply 1 into DC power and supply the DC power to DC load 4 and to supply the DC power generated in solar battery 2 and the DC power of storage battery 3 to DC load 4. This eliminates the need for installing an inverter for converting DC power into AC power and an AC adapter for converting the AC power generated by the inverter further into DC power according to DC load 4, differently from a conventional uninterruptible power supply system. Power losses caused in the inverter and the AC adapter thus become zero, which reduces a power loss of the entire uninterruptible power supply system. This improves the efficiency of operating the uninterruptible power supply system.

Uninterruptible power supply system 100 controls chopper 30 such that a current having a value greater than a value according to the consumption current in DC load 4 and the charging current of storage battery 3 does not flow from solar battery 2 to DC load 4 during power generation of solar battery 2. As a result, if the consumption power in DC load 4 decreases, a current flowing through chopper 30 is reduced, thus preventing voltage VDC of output terminal T4 from becoming excessively high due to the surplus power of solar battery 2.

If output voltage VDC of uninterruptible power supply apparatus 5 rises to exceed upper limit voltage VDCH during power generation of solar battery 2, a current flowing from solar battery 2 through chopper 30 to output terminal T4 is reduced. Further, when output voltage VDC of uninterruptible power supply apparatus 5 rises to exceed upper limit voltage VDCH during supply of DC power of storage battery 3 to DC load 4, a current flowing from storage battery 3 through chopper 50 to output terminal T4 is reduced. Even when the consumption power of DC load 4 decreases, thus, an excessive increase in voltage VDC of output terminal T4 can be reduced, preventing damage to DC load 4.

Further, when voltage between terminals VB of storage battery 3 exceeds upper limit voltage VBH, a current flowing from output terminal T4 through chopper 50 to storage battery 3 is reduced. Even when the surplus power of solar battery 2 becomes excessively high, thus, an excessive increase in voltage between terminals VB of storage battery 3 can be reduced, preventing damage to storage battery 3.

The embodiments disclosed herein are illustrative and non-restrictive in any respect. The scope of the present invention is defined by the terms of the claims, rather than the embodiments described above, and is intended to include any modifications within the scope and meaning equivalent to the terms of the claims.

REFERENCE SIGNS LIST 1 commercial AC power supply, 2 solar battery, 3 storage battery, 4 DC load, 5 uninterruptible power supply apparatus, 6-8 current sensor, 10 converter, 30, 50 chopper, 20, 40, 60 controller, 31 MPPT control device, 32, 34, 43, 47, 51, 54, 61, 64 subtracter, 33, 41, 52 voltage control device, 35, 55 adder, 36 selector, 38, 56 multiplier, 39, 46, 53, 57, 63 limiter, 40A power generation reducing device, 40B, 60C overvoltage reducing device, 42, 59 filter, 45, 62 divider, 48, 68 current control device, 49, 69 PWM control device, 60A voltage controller, 60B overcharge reducing device, 100 uninterruptible power supply system, C0-C3 capacitor, L1-L3 reactor, Q1-Q9 switching element, D1-D10 diode, T1-T4 terminal.

The invention claimed is:

1. An uninterruptible power supply system for supplying DC power to a DC load, the uninterruptible power supply system comprising:
an uninterruptible power supply apparatus connected between a commercial AC power supply and the DC load;
a solar battery configured to convert sunlight energy into DC power; and
a power storage apparatus configured to store DC power, wherein
the uninterruptible power supply apparatus includes
an output terminal connected to the DC load,
a first DC/DC converter configured to perform DC voltage conversion between the solar battery and the output terminal,
a second DC/DC converter configured to perform DC voltage conversion between the power storage apparatus and the output terminal,
a converter connected between the commercial AC power supply and the output terminal and configured to convert AC power supplied from the commercial AC power supply into DC power,
a first controller configured to control the first DC/DC converter to flow a current according to a first current command value from the solar battery to the output terminal,
a second controller configured to control the second DC/DC converter to flow a current according to a second current command value between the power storage apparatus and the output terminal, and
a third controller configured to control the converter such that a voltage of the output terminal is equal to a reference voltage during normal operation in which the commercial AC power supply supplies AC power,
the first controller is configured to generate the first current command value based on a smallest value of
an output current when an output voltage of the solar battery is equal to an optimum operating voltage in maximum power point tracking control, and
an output current for outputting a consumption current between the solar battery and the DC load and a charging current of the power storage apparatus, and
the second controller is configured to generate the second current command value such that a voltage of the output terminal is equal to the reference voltage.

2. The uninterruptible power supply system according to claim 1, wherein the first controller is configured to reduce the first current command value when the voltage of the output terminal exceeds a first upper limit voltage higher than the reference voltage.

3. The uninterruptible power supply system according to claim 1, wherein the second controller is configured to reduce the second current command value when the voltage of the output terminal exceeds a first upper limit voltage higher than the reference voltage.

4. The uninterruptible power supply system according to claim 1, wherein
the second DC/DC converter is configured to charge the power storage apparatus with surplus power of the DC power generated in the solar battery, and
the second controller is configured to reduce the second current command value when a voltage between terminals of the power storage apparatus exceeds a second upper limit voltage lower than the reference voltage during charging of the power storage apparatus.

5. The uninterruptible power supply system according to claim 1, wherein
the second controller is configured to generate the second current command value such that the voltage of the output terminal is equal to the reference voltage, and to stop discharging of the power storage apparatus when a remaining capacity of the power storage apparatus is not greater than a lower limit capacity while power generation of the solar battery is stopped, and
the third controller is configured to control the converter while power generation of the solar battery is stopped such that the voltage of the output terminal is equal to the reference voltage after discharging of the power storage apparatus is stopped.

6. An uninterruptible power supply apparatus for supplying DC power to a DC load, the uninterruptible power supply apparatus comprising:
an output terminal connected to the DC load;
a first DC/DC converter configured to perform DC voltage conversion between the output terminal and a solar battery that converts sunlight energy into DC power;

a second DC/DC converter configured to perform DC voltage conversion between the output terminal and a power storage apparatus that stores DC power;

a converter connected between a commercial AC power supply and the output terminal and configured to convert AC power supplied from the commercial AC power supply into DC power;

a first controller configured to control the first DC/DC converter to flow a current according to a first current command value from the solar battery to the output terminal;

a second controller configured to control the second DC/DC converter to flow a current according to a second current command value between the power storage apparatus and the output terminal; and a third controller configured to control the converter such that a voltage of the output terminal is equal to a reference voltage during normal operation in which the commercial AC power supply supplies AC power, wherein the first controller is configured to generate the first current command value based on a smallest value of an output current when an output voltage of the solar battery is equal to an optimum operating voltage in maximum power point tracking control, and an output current for outputting a consumption current between the DC load and the solar battery and a charging current of the power storage apparatus, and the second controller is configured to generate the second current command value such that the voltage of the output terminal is equal to the reference voltage.

\* \* \* \* \*